United States Patent [19]

White et al.

[11] Patent Number: 4,736,826
[45] Date of Patent: Apr. 12, 1988

[54] REMOTELY CONTROLLED AND/OR POWERED MOBILE ROBOT WITH CABLE MANAGEMENT ARRANGEMENT

[75] Inventors: John R. White, Oak Ridge; Paul E. Satterlee, Jr., Knoxville; Kenneth L. Walker, Clinton; Howard W. Harvey, Oak Ridge, all of Tenn.

[73] Assignee: Remote Technology Corporation, Oak Ridge, Tenn.

[21] Appl. No.: 726,012

[22] Filed: Apr. 22, 1985

[51] Int. Cl.$^4$ .................. B25J 5/00; H02G 11/00; H02G 11/02
[52] U.S. Cl. .................. 191/12.2 A; 191/12.2 R; 191/12.4; 901/1
[58] Field of Search .................. 191/12 R, 12.2 A; 180/6.5; 901/1

[56] References Cited

U.S. PATENT DOCUMENTS

| 3,632,906 | 1/1972 | Aihara | 191/12.2 A |
| 4,010,346 | 3/1977 | Cecil et al. | 901/1 X |
| 4,046,262 | 9/1977 | Vykukal et al. | 901/1 X |
| 4,511,100 | 4/1985 | Oetringhaus | 191/12.2 A X |

FOREIGN PATENT DOCUMENTS 0214917  12/1984  Japan .................. 104/172 S

OTHER PUBLICATIONS

J. R. White, R. E. Eversole, K. A. Farnstrom, H. W. Harvey, H. L. Martin, "Evaluation of Robotic Inspection Systems at Nuclear Power Plants," Mar. 1984, pp. iii, 1-1, 1-2, 1-3, 2-11, 4-1, 4-2, 4-3, 4-18.

"Nuclear Power Plant Emergency Control Robot", *Robotics Age*, Mar./Apr. 1983, pp. 18-21.

*Primary Examiner*—Robert B. Reeves
*Assistant Examiner*—Charles Barrett
*Attorney, Agent, or Firm*—Staas & Halsey

[57] ABSTRACT

A mobile robot remotely controlled and/or powered through a cable from a stationary console is provided. The robot carries a cable management arrangement which stores the cable and dispenses and retracts it as needed. The arrangement lays down the cable under zero tension when the robot is outbound and reels it in as the robot returns to allow the robot to follow a tortuous path without entangling the cable under or around obstacles. The robot can have numerous configurations such as a simple configuration for use as a transporter for mail in an office and parts in a factory, to a complex configuration with robotic arms and sensors for use in remote surveillance and security work. The robot is especially usable in hostile environments such as nuclear power plants and has a containment box permitting it to be moved to numerous locations without contaminating other areas.

14 Claims, 8 Drawing Sheets

REMOTELY CONTROLLED AND/OR POWERED MOBILE ROBOT WITH CABLE MANAGEMENT ARRANGEMENT

This invention was made with Government support under Contract No. NRC-04-84-140 awarded by the U.S. Nuclear Regulatory Commission. The Government has certain rights in this invention.

This invention relates to mobile robots using a cable connected to a remote source for supplying control signals and/or power.

Mobile robots as a replacement for workers is becoming of increasing interest. Generally this interest has been directed toward work that is hazardous, repetitious or involves simple motions.

A primary use under consideration is for the purpose of surveillance and inspection in nuclear power plants so as to reduce the radiation exposure of workers. In addition, experience with robotics at automated manufacturing plants indicate that man hours and time required to do work can also be decreased and worker safety and work quality improved. In addition to nuclear power plants, mobile robots could be used in place of security guards, in hazardous areas of chemical processing plants, and to perform some of the hazardous jobs of soldiers, such as mine field clearing. Numerous other tasks could be performed by remotely controlled and/or powered mobile robots to decrease a worker's exposure to bodily harm and unhealthy environments as well as relieve a worker from monotonous and unproductive jobs.

In developing mobile robots, one of the most difficult areas is the provision of a communication and/or power link between the mobile robot and a remote station. It has been suggested that the communication be by radio links. Unfortunately, this is usually undesirable since it is expensive, frequently unreliable because of local electrical disturbances, may require a license from governmental authorities and in some cases just will not work satisfactorily. A solution to this is supplying a cable link between the robot and the remote control unit. However, managing the cable to keep it out of the way or from becoming entangled can require the addition of at lest one extra person to accomplish this part of the job. In addition to carrying control signals and various information from sensors and television cameras, it is also sometimes desirable to furnish power to the robot through the cable.

The mobile robot of this invention is of a type that permits a human to intervene in the control loop so as to be able to maneuver the robot from a remote location. Provisions may also be made for the robot to repeat its activity or perform various other programming tasks automatically and autonomously. Sometimes robots of the type shown herein are referred to as teleoperated mobile units or teleoperated mobile manipulators when the robot carries a robotic arm or other device that can be used for remote manipulation.

The robot system as shown herein is made up of three major components. The major component is the mobile robot itself which is operatively connected through a cable to the inside of a containment box which is in turn operated through another cable to a control console. The control console itself is not a part of this invention, and can be of any suitable type depending on the use of the robot and the various features desired. The mobile robot is of circular configuration with a base member containing six rechargeable batteries driving the variable speed, reversible electric gear motors which in turn drive two drive wheels. A third swivel wheel is also provided which is not driven. All the wheels are eight inches in diameter and are designed so they can go over obstacles at least two inches high and can go through at least three inches of water. The three wheels are placed substantially entirely within the periphery of the diameter of the base member which is thirty inches. The two drive wheels are independent of one another so that if one is going one direction and the other going the other direction, the robot can turn almost within its own diameter and negotiate obstacles in a labrynth or maze representative of the kind of conditions often found in nuclear power plants. Each of the geared drive motors for the drive wheels have associated with them optical encoders which serve as position indicators for the robot as the rotations are followed and calculated using well known methods by a control computer associated with the system to indicated the amount and direction of travel. The encoders furnish a thousand bits per rotation which translates into 0.025 inches of linear travel per bit, and the robot can return to an original location usually within one-eighth to one-fourth inch accuracy. Mounted above the base assembly is the cable handling and storage assembly or reel assembly. This assembly stores the cable on a reel which is driven by a gear motor through a chain and sprocket arrangement. The reel in one arrangement contains one hundred fifty feet of cable which is made up of thirteen twisted wire pairs. The twisted wire pairs may be dedicated one each for video, audio, intercom and deadman and two for telemetry and seven for electrical power. The cable is 0.48 inches in diameter and for application in a nuclear power plant this length is sufficient. Associated with the reel drive is a position sensor which is a potentiometer furnishing a continuous inventory of the amount of cable dispensed versus the cable still on the reel.

The cable handling and storage arrangement also includes a cable feed which consists of a pulley or sheave having a groove which is shallower than the 0.48 inch diameter of the cable. The cable is pressed into the groove by a spring tensioner or friction generator and adjusted so that about twenty-three pounds of pressure is applied to the cable so that friction between the cable and sheave is increased when the sheave rotates to move the cable. This amount of pressure could be reduced and, of course, is varied under the circumstances, type of cable used, and the like. The part of the spring tensioner that serves as a friction generator in pressure contact with the cable is a nylon rotating member whose flat face is wider than the sheave with flanges to prevent the cable from moving off of the face.

When the mobile robot is outbound from its station, the rotation of the drive wheels is indicated by the optical encoders. Through well known processing, such indication is translated into an indication of movement of the robot. This information is used to feed signals to the cable feed drive motor to cause the cable to be fed out or dispensed at the same rate as the robot is moving so that there is no tension on the cable between the robot and its base station. If there way any substantial tension, the movement of the robot would cause the cable to pull up under obstacles or otherwise get entangled. At the same time the cable is being fed out, the reel drive is being driven in a cooperative manner. For example, if there was slippage on the cable feed, the reel drive would apply power to unreel and assist the cable being fed out so there would be no slippage, and if the robot stops suddenly after a high rate of travel, the inertia of a full reel could cause the reel to overshoot and causes excess cable being fed from the reel. In this case the reel motor would immediately apply a back pressure to serve as a brake on any further payout of the cable from the reel and prevent a pile-up of the cable. Usually the reel motor applies a small back pressure to maintain some tension in the cable between the reel and the cable feed, but as said earlier, this sometimes requires the reel to be turned in a forward direction.

When the robot returns to its station or partially reverses, the cable is retrieved. In retrieving, the primary force is created by the reel winding up the cable with back pressure being supplied by the cable feed. The cable feed in effect acts as a tensioner to keep the cable taught between the cable feed and reel so that the cable lays nicely into a tight bundle. Otherwise, it would be loose and not as much cable would be accommodated on the reel. Again, the forces are being applied to the drive motors of the reel and cable feed are determined by the encoders so that when the encoders from the drive wheels indicate cable should be retracted, the amount so indicated as needing retraction serves to drive the reel motor with the control determining the speed and number of revolutions based on the diameter of the cable on the reel as when the reel is almost full less turns of the motor are required to take up the same amount of cable as when the reel is substantially empty. Likewise, the amount of back pressure to be applied by the cable feed is fed to the cable feed drive motor. The control system, which is not part of the invention, is such that it keeps track of the amount of the cable being present on the reel because obviously a full reel would have the cable dispensed from a different radius than a reel that is almost empty.

The end of the cable on the reel has a slip ring assembly connecting the cable to the mobile robot. This is a standard commercially available slip ring assembly or capsule available from Poly-Scientific, 1213 N. Main Street, Blacksburg, Va. 24060, as their number AC 3877. The slip ring permits the reel to rotate withoout twisting the cable.

The cable utilized carries both electric power and a number of sensed signals including video using twisted pairs of wires. If desired, to have a smaller diameter cable and carry more information, an optical fiber can be used with the information multiplexed thereon. This will eliminate many of the wires in the cable but the cable would still have to carry the power unless it is decided that a different type of power source is to be used on the mobile robot such as a built in gas-electrid generator or sufficient batteries for the duty cycle so that no trickle charging is required until the robot has returned to its base station.

Normally, the amount of power being supplied by the cable to the battery is from battery chargers in the console and is sufficient to drive the robot and power the control system under continuous duty so there will not be any discharge of the batteries. However, if some of the equipment being carried by the robot such as lights for the television, fans for air sampling, and other intermittent heavy uses of electricity, then the batteries supply the sufficient extra power to accommodate this intermittent heavy use duty cycle. If sufficient power were supplied through the cable to accommodate all of these uses, then the cable would usually be too heavy and difficult to accommodate on its storage reel. Upon power failure, the batteries can continue to drive the robot for several hours.

The drive arrangement for the robot can utilize many types of prime movers. While the specific one illustrated uses two drive wheels and a swivel wheel, other types can include tracked vehicles that are able to climb stairs, multiple legs, or wheels greater than the three utilized. However, the present robot is able to maneuver up 10° slopes, turn in tight spaces and otherwise be used in most of the applications desired.

The cable from the mobile robot is connected to a station which, if the robot is preprogrammed or the control signals and sensed signals are transmitted by radio or similar means, the cable may merely transmit power. This would be useable in the simplest embodiments as transporters such as mail carts in office buildings or smart carts for carrying parts in a factory between various work stations. However, as shown for use in nuclear power plants, the cable is preferably terminated inside of a containment enclosure which is in the form of a box.

The containment box is of a size to house the mobile robot such that when the door is closed it is tightly constrained from movement within the box. The box is portable and has provisions where it can be picked up by various types of lifting devices and moved from one location to another in a plant. Frequently the economics of the use of a robot are such that it is not justified to be used in a single location but must be economically justified by being utilized in several locations. The bottom of the box has inserted over it a removable floor spaced slightly from the bottom. Also the box has a removable ramp that engages the edge of the opening in the box so that the robot can return up the ramp under its own power and into the box and onto the removable floor. The top of the ramp and floor are at the same level. The ramp is then hung from the inside of the door and the door closed so that the contamination on the robot and inside the box is not a source of contamination to other areas when the box and robot are moved to a new location. Since most of the contamination of the box is from material from the wheels deposited on the ramp and in the false bottom, these can be either thrown away or separately removed for decontamination procedures.

The robot system also includes a console from which the activities of the robot can be monitored and controlled and the console is connected by a cable carrying both power, control signals and signals of sensed information such as television between the console and the containment box. The console is by itself not a part of the invention and can be of any acceptable design, but it should be portable with the robot and containment box so that they can be used in more than one location.

The mobile robot described above is the base unit. Upon this base can also be mounted one or two robotic arms of the kind readily available commercially, television cameras, any of a number of sensors such as radiation probes, humidity sensors, leak detectors and air samplers; lights, and telescoping means for the television camera. Since none of the these additional items are a part of the invention and are readily available from commercial sources, they are only shown in the application for illustrative purposes.

The main object of this invention is to provide a mobile robot which can be powered and/or controlled through a cable from a remote location which has provisions for managing the cable such that it can be dispensed and retracted with substantially zero tension on the cable between the robot and its station. Another important object of the invention is the provision of a containment box operatively connected by the cable from inside the box to the mobile robot. Numerous other objects will appear to those reading this disclosure.

The foregoing objectives and advantages of the invention will be more fully understood from the following detailed descriptions of the invention with reference to the accompanying drawings wherein.

Figure 1:
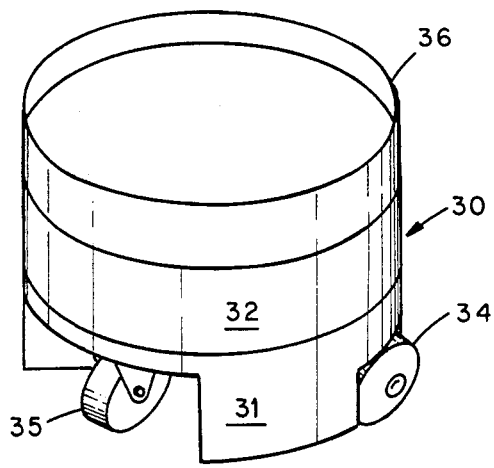
FIG. 1 shows a perspective view of a robot transporter.
Figure 2:
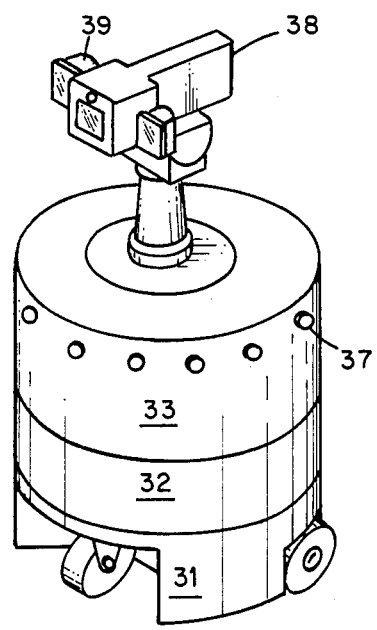
FIG. 2 shows a perspective view of the robot transporter like FIG. 1 with sensors and an elevating television camera.
Figure 3:
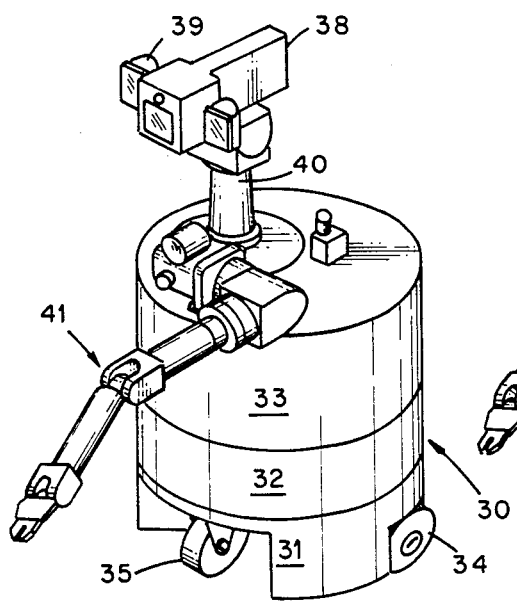
FIG. 3 shows a perspective view similar to FIG. 2 with the addition of a single robotic arm.
Figure 4:
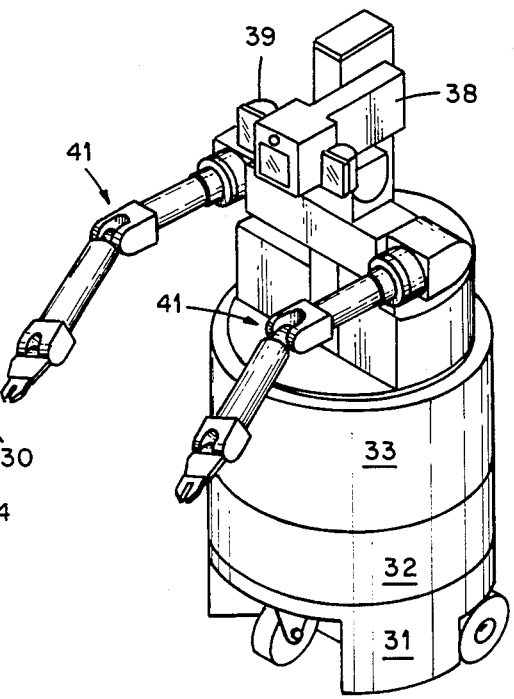
FIG. 4 shows a perspective view of the robotic transporter like FIG. 1 with two robotic arms and a television camera.

Referring to FIGS. 1 through 4, there is shown a family of robots based on the present invention. In FIG. 1 there is a robot transporter version 30 of the mobile robot. It has a lower base assembly 31, a reel assembly 32 and a rim 36 to keep objects being transported from falling off the unit as it moves. The lower base assembly is supported by two drive wheels 34 and one swivel wheel 35. FIG. 2 is a modification of FIG. 1 showing an upper base assembly 33 which contains a series of sensors 37, a television camera 38 and two lights 39 for the camera. The camera is on an elevating mount 40 which is readily available from commercial sources and is preferably of a type formed from three high strength steel tapes originally used to deploy space satellite antennas. It can extend itself to a controlled height fifteen times its collapsed length. Other similar telescoping mechanisms may also be used. In FIG. 3 is shown another version of the mobile robot which is based on a modification of the one shown in FIG. 2 and has a robotic arm which is like that commercially available from Remote Technology Corporation, 114 Union Valley Road, Oak Ridge, Tenn. 37830. The arm can be folded back on itself so as to not extend beyond the periphery of the circular shape of the robot. FIG. 4 is another embodiment of the mobile robot which has two of the standard available robotic arms in addition to a television camera 38 and lights 39.

Figure 5:
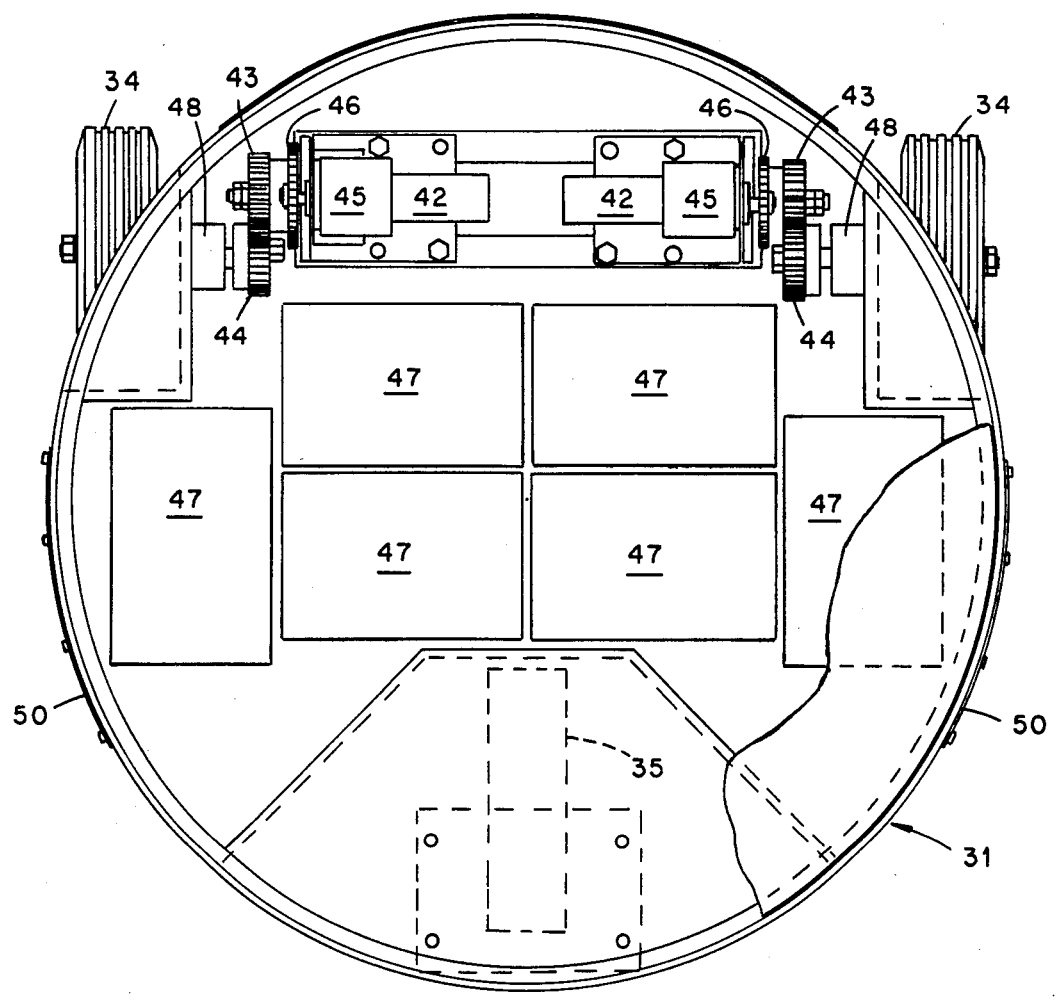
FIG. 5 shows a plan view of the lower base assembly.
Figure 6:
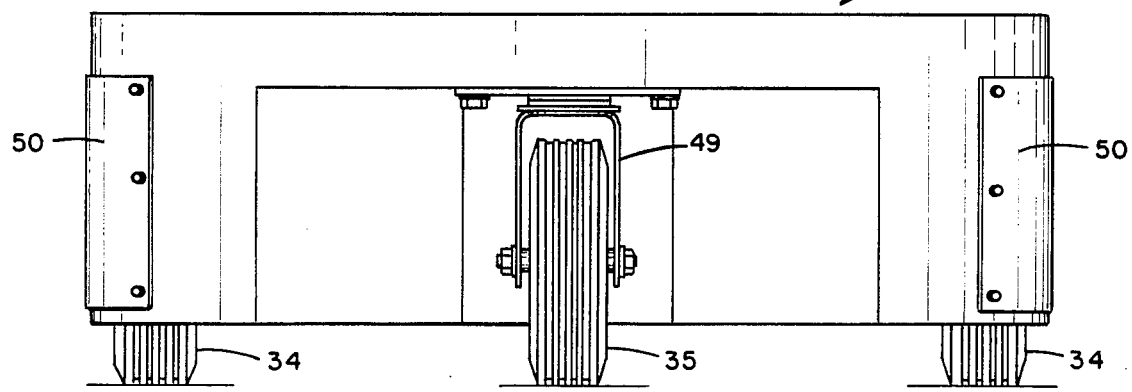
FIG. 6 shows a rear elevation view of FIG. 5.
Figure 7:
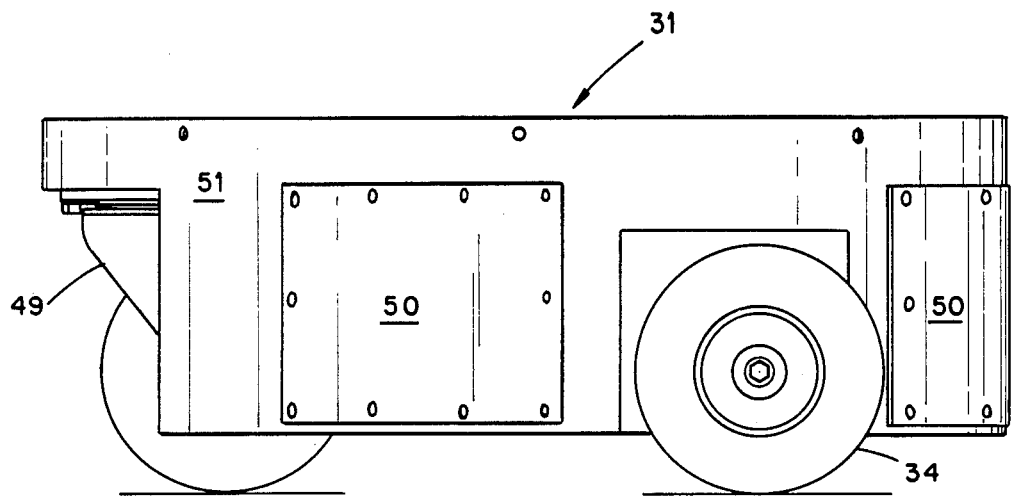
FIG. 7 shows a side elevation view of FIG. 5.

Turning to FIGS. 5, 6 and 7, there is detailed the components of the lower or base assembly. Each of the drive wheels 34 are mounted in drive wheel bearing assemblies having an inboard wheel drive gear 44 meshing with a motor output gear 43 driven by a variable speed reversible electric geared wheel drive motor 42. Also coupled to the drive motor through encoder drive gear 46 is an optical encoder 45. The lower base assembly contains six batteries 47 for powering the mobile robot. Preferably, the batteries are Globe Gel/Cell 99 F1807 available from Newark Electronics, 6500 Papermill Road, Knoxville, Tenn. 37919. In addition to the two drive wheels, the robot is supported by a third swivel wheel 35 carried in swivel bracket 49. Surrounding the periphery of the robot are several access covers 50 and a metal enclosing skirt 51.

With reference to FIGS. 8 through 12, there is shown the reel assembly which has a reel frame 52 and a joinder ring 53 for joining to the lower base assembly. The reel mounting plate 54 is carried by the reel frame and it includes a roller bearing assembly 55 offset from the center of the reel frame. Roller bearing assembly is carried in a bearing retainer 56 affixed to the reel mounting plate. Carried by the roller bearing is a reel stub shaft 58 that is rotatingly mounted but fixed from up and down movement. Carried by the reel stub shaft 58 at its lower end is reel 57 and at its upper end cable sprocket 59. Through a series of standoff posts 60 and reel screws 63 there is a cable retainer mount 61 defining the bottom side of the reel. Between the cable retainer mount 61 and the cable mounting plate 60 there is stored the wound up and retracted cable 65. The reel 57 is surrounded by a cable skirt 64 which extends most of the periphery around the reel except for that part of the periphery not shown in the drawing where the cable exits to be dispensed from the reel assembly above the swivel wheel. The cable skirt has a sufficient clearance from the reel 57 to permit the reel's rotation, but at the same time the clearance is so small as to prevent the cable from falling through the clearance annulus.

The inboard end of the cable has a cord grip 65a affixing it in position so that it can rotate with the reel through a slip ring capsule 66. The fixed part of the slip ring 66 leads the power and communication cables to the proper places within the mobile robot. Thus, the reel is free to rotate as it dispenses and retracts the cable without it being twisted.

Figure 8:
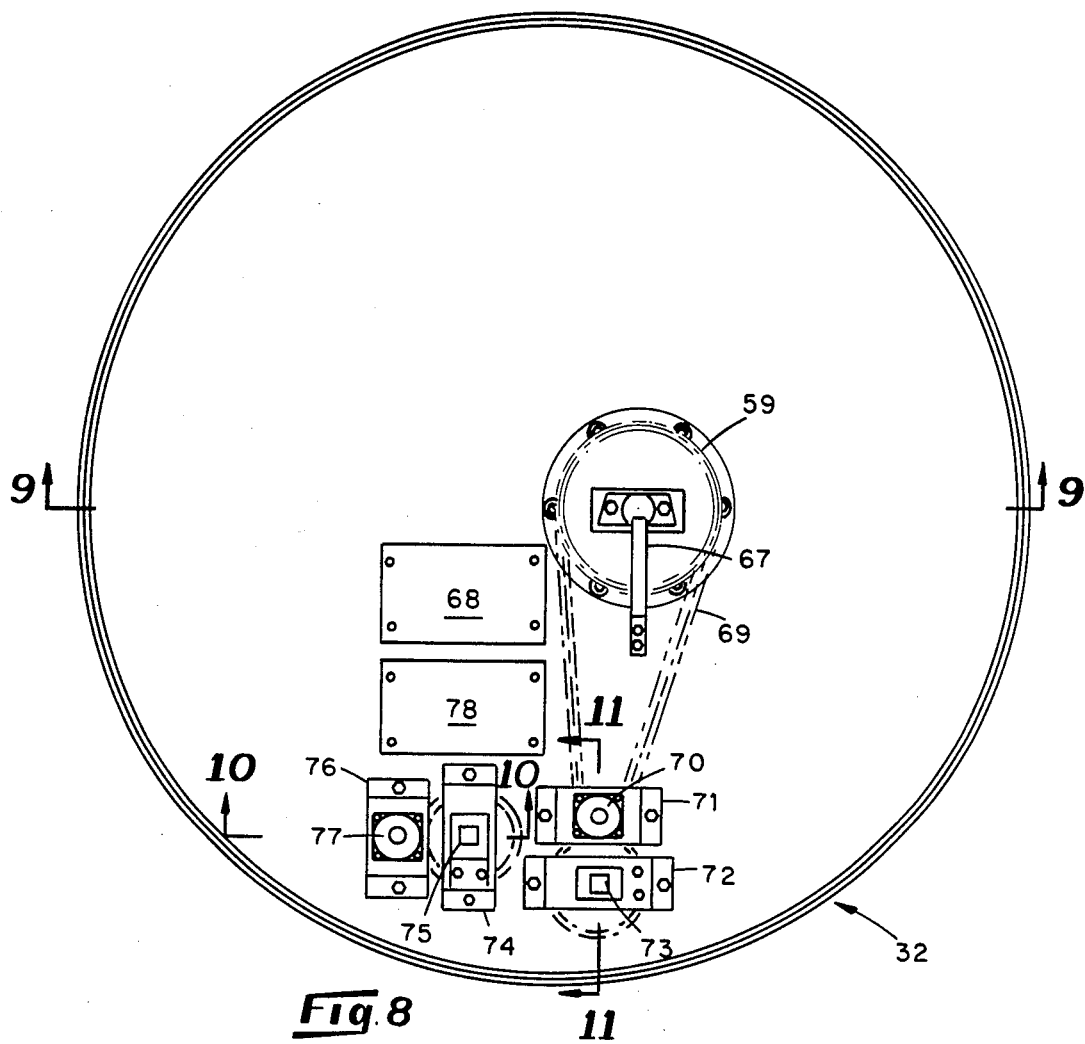
FIG. 8 shows a top plan view of the cable management system.
Figure 9:
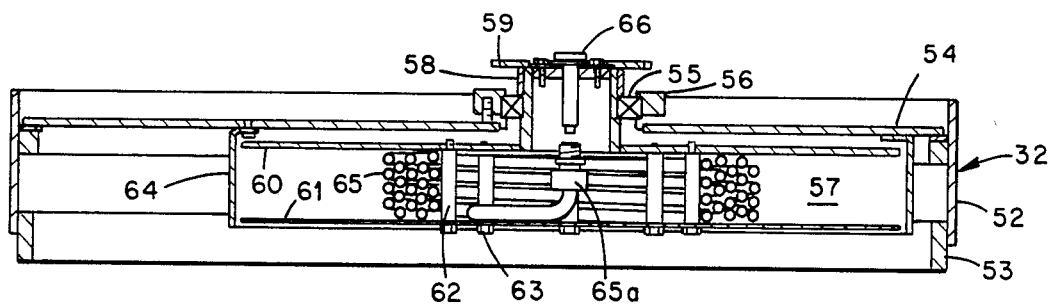
FIG. 9 shows a section view of FIG. 8 taken along section 9—9.

As best seen in FIG. 8, the cable sprocket 59 is driven by roller chains 69 by reel planetary gear motor 70 mounted on reel drive motor mount 71. In order to prevent the slip ring capsule 66 from rotating, there is provide slip ring anti-rotate bracket 67.

Two motor amplifiers 68 and 78 are carried by the reel assembly. Reel planetary gear motor 70 is operatively connected to the reel drive potentiometer encoder 73 mounted on reel drive encoder mount 72. Also shown in FIG. 8 is cable drive planetary gear motor 77 mounted on cable drive motor mount 76 and operatively associated through meshed gears to continuously rotating cabled drive potentiometer encoder 75 mounted on cable drive encoder mount 74.

Figure 12:
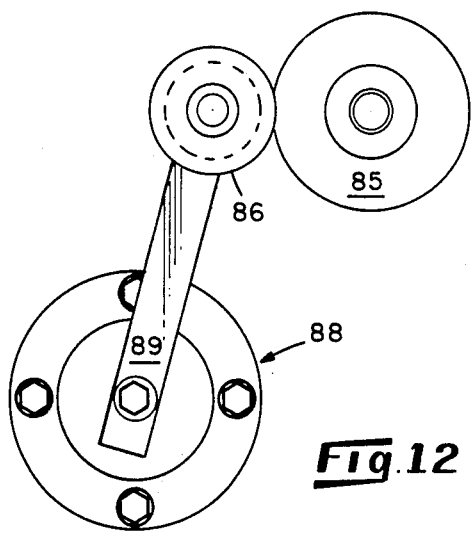
FIG. 12 shows details of the sheave and roller chain tensioner as seen from a bottom view of FIG. 10.
Figure 10:
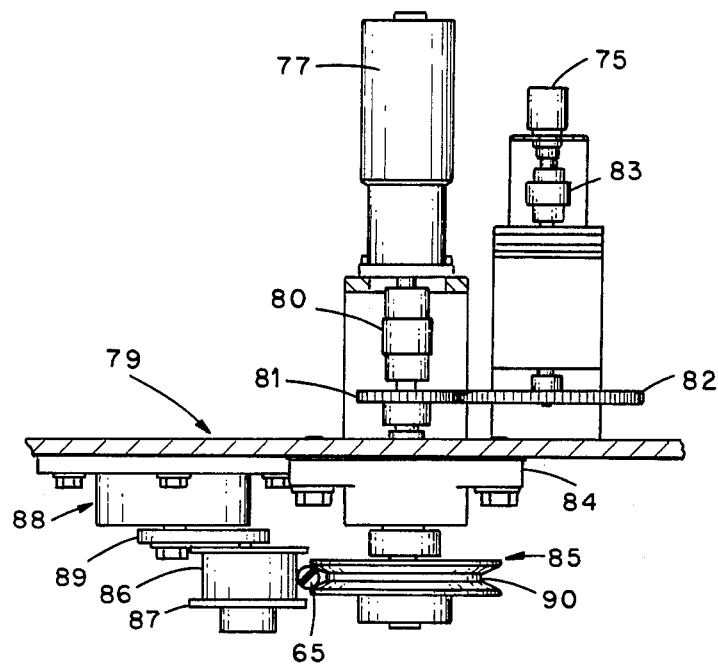
FIG. 10 shows a section view of FIG. 8 taken along section 10—10.

With reference to FIG. 10 which is a cross-section along section 10—10 of FIG. 8, and to FIG. 12 there is shown a cable feed assembly 79. The cable drive planetary gear motor 77 drives a spur gear 81 through multi-jar coupler 80. Spur gear 81 intermeshes with spur gear 82 attached to cable drive potentiometer encoder through coupler 83. The cable drive planetary gear motor 77 also drives iron groove pulley or sheave 85 which is mounted on a shaft carried by flanged bearing 84. The sheave has a groove 90 in which cable 65 frictionally is carried. The friction is generated when sheave 85 rotates as cable 65 is pressed into the groove by friction force roller 86 made preferably of nylon which is carried at the end of roller chain tensioner arm 89 that is under approximately twenty-two pounds tension created by roller chain tensioner 88, a readily available commercial item. The nylon friction force roller 86 has two flanges 87 which are spaced wider than the sheave 85 to assist in keeping cable 65 from riding off the face of the roller. It is to be noted that sheave 85 has a sheave groove 90 which is of less depth than the diameter of the cable 65.

Figure 11:
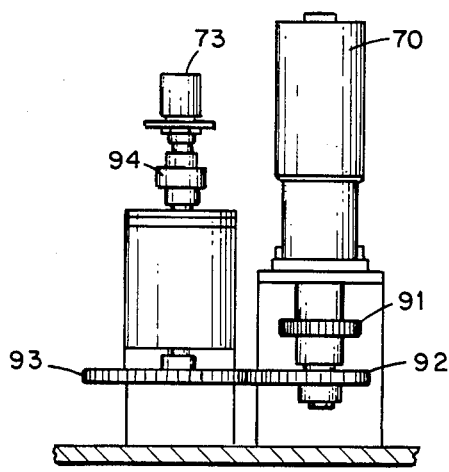
FIG. 11 shows a section view of FIG. 8 along section 11—11.

With reference to FIG. 11 which is a sectional view of section 11—11 taken on FIG. 8, there is shown the reel planetary gear motor 70 and encoder 73. The gear motor 70 carries a sprocket 91 for driving the roller chain 69. Also driven by reel planetary gear motor 70 is a spur gear 92 meshing with spur gear 93 to drive reel drive potentiometer encoder 73 through coupling 94.

Figure 13:
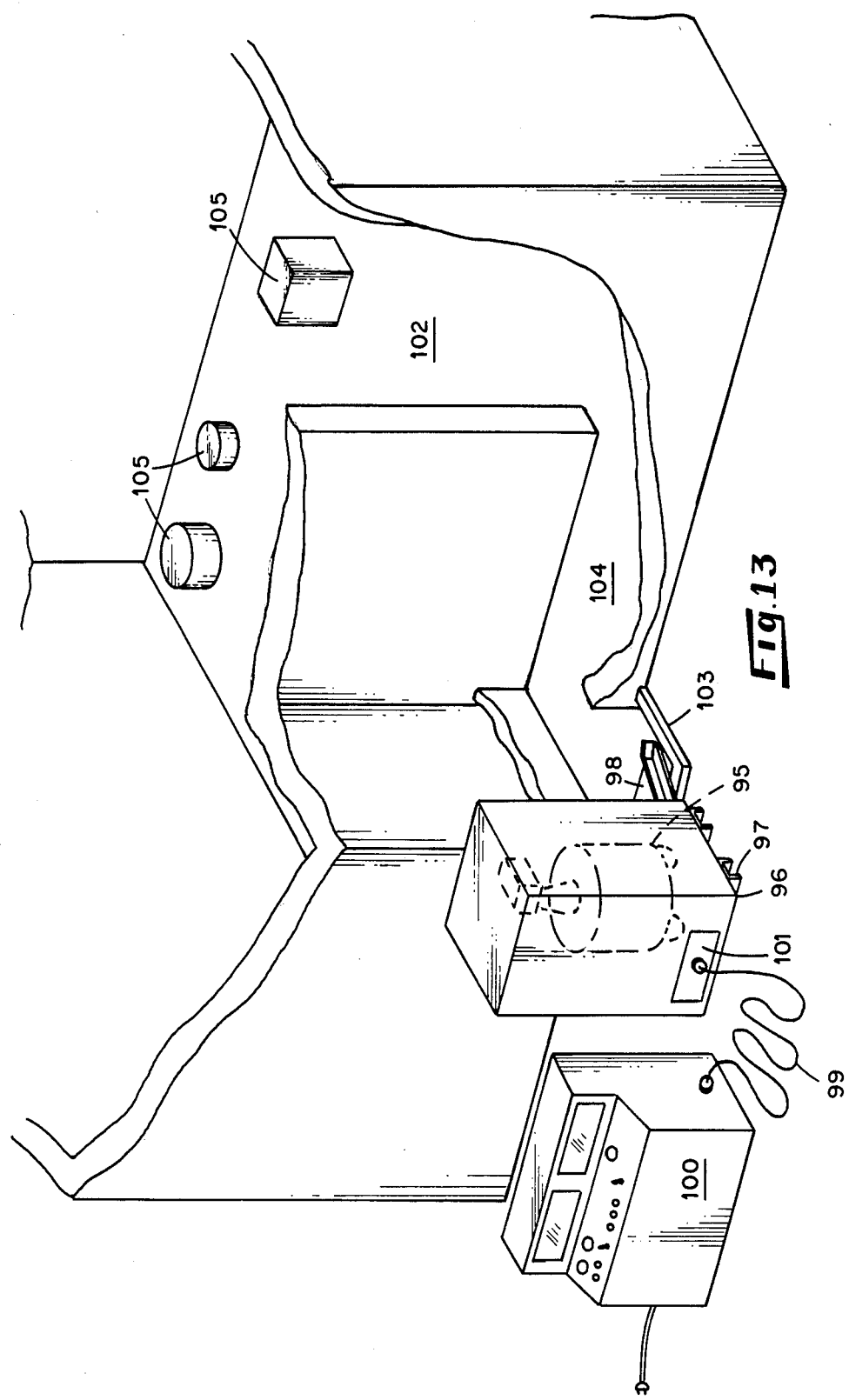
FIG. 13 shows a perspective view of the robot transporter housed in a containment box adjacent a computer system control console arranged for use in a labrynth entrance to a radioactive area.

With reference to FIG. 13, there is shown a schematic of one application of the mobile robot 95 of FIG. 2 in a nuclear power plant. Robot 95 is contained in a containment box 96 which has skids 97 adapted to receive a fork lift or similar lifting arrangement for transporting the box with robot to another location. It has a ramp 98 that permits the robot to ingress and egress into the box under its own power. The robot cable 65 is not shown in FIG. 13 but runs from the robot to the interior of the box. There is a cable connection 99 between the containment box 96 and a console 100. The cable carries power and serves as a communication link between the console and the robot through the intermediate containment box. The cable is attached to the box at a removable panel 101 which can be removed for a fast charge of the robot in its box as opposed to the normal trickle charge.

The robot is disposed so as to be able to enter the controlled radiation area 102 of a nuclear power plant. As a standard method of protection, the area has a small dam 103 for containing any liquids in the controlled area and a labyrinth entrance 104 having two right angle turns. Inside the area, there is shown three obstacles 105 as representative of the type of conditions that would be met in which the robot would have to maneuver around in order to make its inspection and surveillance. In order to negotiate in such a a controlled area it is necessary that the robot be able to maneuver in a space approximately its own size and must lay down the cable on its trip out with zero tension between the robot and the containment box else the cable could pull up under various objects and otherwise get entangled. Generally when the robot returns to the containment box, it executes a reversal of it outbound path although provisions can be made for the robot in some cases to return directly to its box if there are no obstacles in its way. If that is done, the cable must be retracted on a manual basis using the television camera on the robot to determine the amount of slack in the system.

The console is used for remote control and for monitoring the sensors and television camera located on the robot. Generally speaking, as much of the electronics, such as computers, memory and the like are kept out of the controlled area and kept with the console. However, the console is not part of this invention and would be varied with different locations. It is merely shown as representative of a type that could be used.

Figure 14:
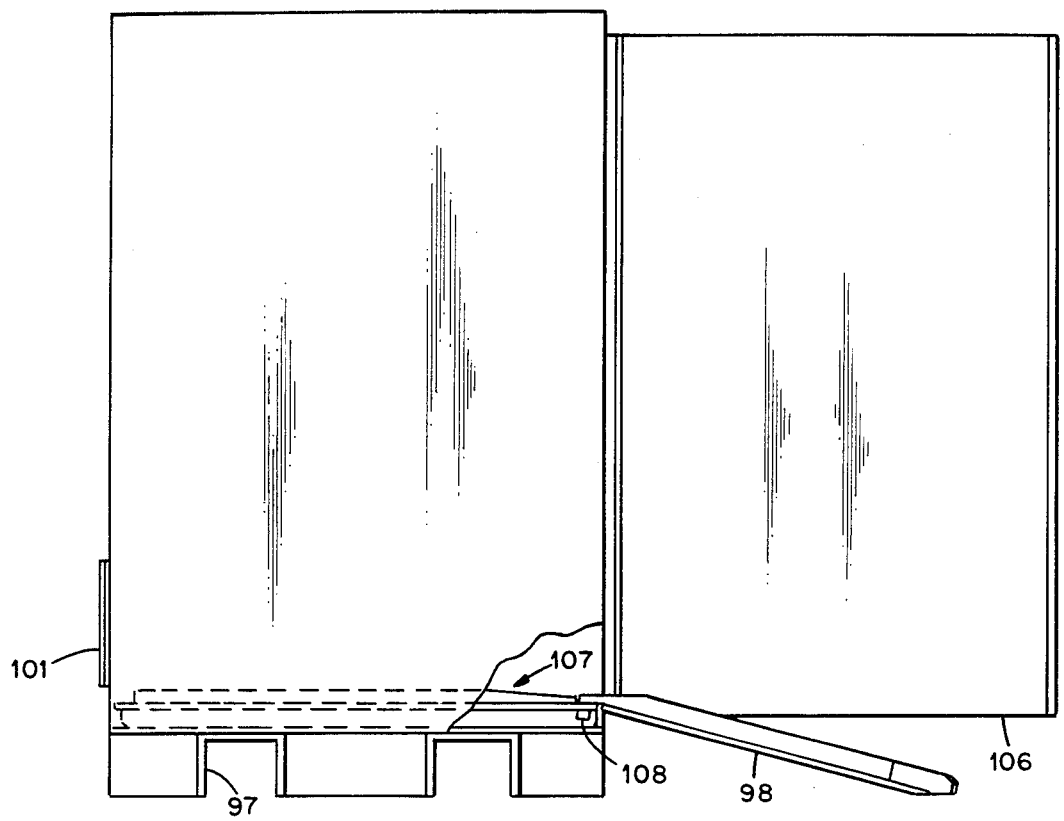
FIG. 14 shows a side view of a containment box with the door open and ramp in place.
Figure 15:
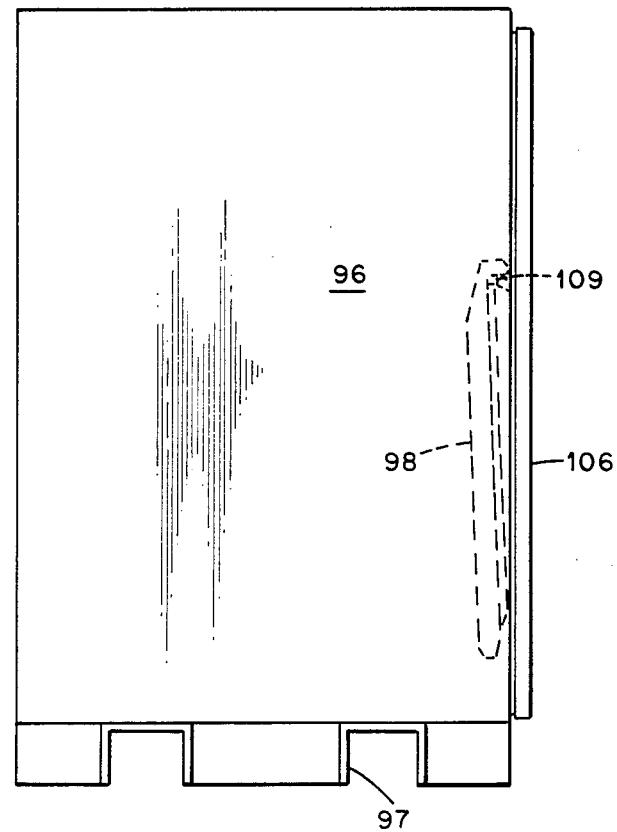
FIG. 15 shows a view similar to FIG. 14 with the door closed and ramp in stored position on the inside of the door.

With reference to FIGS. 14 and 15, there is shown a containment box of this invention. FIG. 14 shows a side view of the box with the door 106 open and a broken-away section to show the removable floor 107 and the removable ramp 98 in place so that the raised side guides of the ramp, which are slightly wider than the width of the drive wheels of the robot, are terminated at the forward and upward edge by two hooks 108 which extend through openings in the floor 107 to hold the ramp temporarily in place. The two side guides of the ramp keep the robot from falling off the edge of the ramp when it makes its ingress and egress from the box. The removable floor also has two side guides which in addition to helping guide the robot serve to stiffen the floor which is loosely layed in place on brackets stemming around the inside of the box. The containment box 96 has an access cover plate 101 to permit removal and fast recharging of the batteries of the robot when it is in the box and such fast recharging is desired.

The box is mounted on skids 97 which provide openings that can receive a fork lift arrangement such as a low boy to move the portable box from one location to another. During such movement, the ramp 98 is lifted from the position of FIG. 14 and stored on the inside of the closed door on bracket 109. Of course, there could be any number of ways that the ramp could be stored on the inside of the containment box and this is merely illustrative of one method of doing it. Generally, the inside of the box has stiffeners to reinforce it and rubber or foam horizontal ribs of a size that the robot, when in the box with the door closed, will snuggly fit to prevent movement within the box when being transported to a new location.

The door is closed and locked with sufficient tightness so that when the containment box with the robot and ramp is on the inside and it is moved from one location to another, none of the contamination is distributed to other areas. The main contamination in the box is that left by the wheels of the robot on the ramp and removable floor. This can be eliminated by removing the floor 107 and ramp 98 and either decontaminating them or throwing them away and replacing them with new ones. The connector from the inside of the box to the robot is not shown, but it is in the vicinity on the inside of cover plate 101 so that as the robot egresses from the box and dispenses its cable, it remains connected to the console through the cable leading to the inside of the box.

Figure 16:
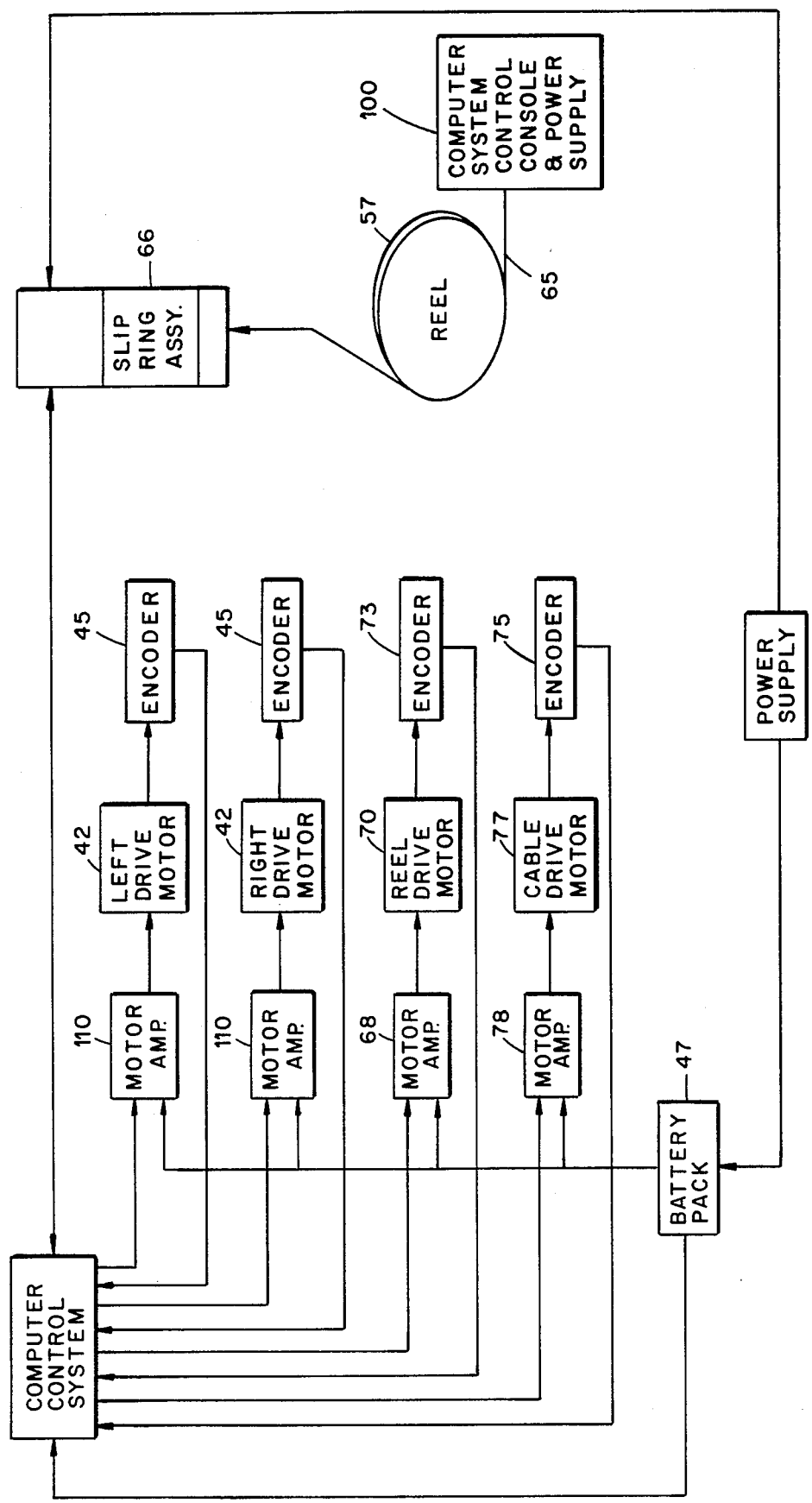
FIG. 16 shows the schematic of a control system for the drive wheels and cable management system of the robot transporter.

With reference to FIG. 16, there is shown a schematic of the power and control circuit for the cable management and storage assembly and mobile robot drive wheels. The left and right drive motors 42 for the drive wheels are identical and are connected to identical motor amplifiers 110 which are standard commercial motor amplifiers available from Copley Controls Company, 375 Elliott Street, Newton, Mass. 02164, as their motor amplifier No. 215. The drive motors 42 are TRW 102A939-9-BL available from TRW Globe Motors, 2275 Stanley Avenue, Dayton, Ohio 45404. Each drive motor also drives identical quadrature-phase optical encoder 45 which is PMI part B-25-0500-AB-5-0 available from PMI Motors, Kellmargen Corp, Syosset, N.Y. 11791. The encoder 45 is in effect a position indicator for the drive wheel and feeds back through the control system to serve to indicate the movement of the robot as earlier indicated.

Likewise the reel drive motor 70 and cable drive motor 77 are actuated by motor amplifiers 68 and 78, respectively and serve to drive encoders 73 and 75, respectively, for indicating their position and direction and rate of movement. The reel drive motor 70 and cable drive motor 77 are available from TRW Globe Motors as planetary gear motor 409A6186-3. The motor amplifiers 68 and 78 are likewise identical and are available from Copley Controls Corporation as their Servo Amplifier No. 201. The encoders 73 and 75 are the same and are available from Bourns, Inc., 1200 Columbia Avenue, Riverside, Calif. 92507, as potentiometer 84A1A-B28-J13 (5 Kohms). The control system for the robot is at the console where the operator actuates the control such as a joy stick to indicate the direction the robot should go and its speed. Top speed is usually one mile per hour. Using well known servo principles, the control system thus directs the movement of the robot in a well known manner both as to speed and direction. The drive wheel encoders 45 then indicate information that determines the dispensing and retraction of the cable in a controlled manner so that the cable will not have any tension on it between the robot and its station. The station is usually the containment box, but may be the control console or some other stationing point.

The remote control and supplying of power is from the console 100 which is connected through the reel 57, carried by the mobile robot by cable 65. The cable 65 is connected through a slip ring assembly 66 to any local control system (not part of this invention), power supply, and battery pack all carried on the robot. The battery pack supplies the power to the various motor amplifiers as well as on-board control system.

While preferred embodiments of the invention has been shown and described, it will be understood that there is no intent to limit the invention by such disclosure, but rather it is intended to cover all modifications and alternate constructions falling within the spirit and scope of the invention as defined in the appended claims.

What is claimed is:

1. A mobile robot system with cable handling arrangement comprising:
   a steerable robot;
   at least one power drive device for driving said robot in both a forward an reverse direction;
   a steering arrangement for steering said robot around obstacles;
   a station for operative connection to said robot;
   a cable connecting said station and said robot;
   a cable handling arrangement and a cable storage arrangement both carried by said mobile robot and transported therewith;
   travel detection means for detecting the amount of travel of said robot and determining the amount of cable to be dispensed or retracted when in the automatic mode based solely on the determination from the amount of travel of said robot;
   said cable handling arrangement and cable storage arrangement including a cable feed controlled by said travel detection means for dispensing out and retracting in said cable as the mobile robot moves away from said station and moves toward said station, respectively, under substantially zero tension in that part of the cable running between said station and said robot; and
   a power device for supplying power to said cable feed.

2. The mobile robot system of claim 1 wherein said mobile robot includes two said power drive devices and each of said power drive devices includes one reversible variable speed electric each of motor which are independently actuated so that said power drive device can cause the robot to change direction by varying the ratio of the speed and direction between said electric motors.

3. The mobile robot system of claim 2 wherein said power drive devices each include a position encoder to provide signals to cause said cable handling and storage arrangement to dispense and retract said cable.

4. The mobile robot system of claim 1 wherein said cable carries electricity and further includes:
   a battery carried by said mobile robot for providing maximum power at said robot when needed and a battery charger at said station for providing electricity over said cable to said mobile robot sufficient to charge said battery under normal duty power use but insufficient to provide electricity for maximum power use.

5. The mobile robot system of claim 1 wherein said station includes a portable containment enclosure, a door for said containment enclosure, and a connection for said cable inside said containment enclosure whereby said mobile robot can drive itself into said enclosure and the door closed to prevent said robot from spreading contamination when it is moved in said enclosure between locations.

6. The mobile robot system of claim 5 wherein said containment enclosure has a bottom and a removable floor above said bottom.

7. The mobile robot system of claim 6 where said containment enclosure has a removable ramp the top of which terminates at the level of said removable floor.

8. The mobile robot system of claim 1 wherein said cable handling and storage arrangement includes a reel for said cable, a slip ring assembly connecting said cable on said reel and said mobile robot and a power reel device for driving said reel.

9. The mobile robot system of claim 1 wherein said cable handling and storage arrangement includes a reel for storing said cable and said cable feed includes a sheave with a groove and a friction generator pressing said cable into said groove.

10. The mobile robot system of claim 9 wherein said sheave groove is more shallow than the thickness of said cable and said friction generator is a spring tensioned roller wider than said sheave.

11. The mobile robot system of claim 10 wherein said power device is a variable speed reversible electric gear motor and which includes a position indicator.

12. The mobile robot system of claim 11 wherein said reel includes a variable speed reversible electric gear motor for driving said reel and a position indicator associated with said variable speed reversible electric gear motor.

13. The mobile robot system of claim 1 wherein said cable handling and cable storage arrangement includes a reel for storing said cable, said cable feed includes a power driven arrangement for gripping said cable and pulling it from said reel to dispense it as said mobile robot moves away from said station and for retrieving said cable as said mobile robot moves toward said station and said cable feed further includes a power drive for said reel that assists said gripping arrangement as needed as said cable is dispensed and retrieved but always maintains a tension in said cable between said reel and said gripping arrangement.

14. A mobile robot system with cable handing arrangement comprising:
- a mobile robot;
- at least one power drive device for driving said robot;
- a station including a portable containment enclosure for operative connection to said robot;
- a cable connecting said station and said robot;
- a cable handling and storage arrangement carried by said mobile robot and transported therewith; said cable handling and storage arrangment including a cable feed dispensing out said cable as the mobile robot moves away from said station under substantially zero tension in that part of the cable running between said station and said robot;
- a power device for supplying power to said cable feed;
- a door for said containment enclosure; and
- a connection for said cable inside said containment enclosure whereby said mobile robot can drive itself into said enclosure and the door closed to prevent said robot from spreading contamination when it is moved in said enclosure between locations.

* * * * *